Figure 1:
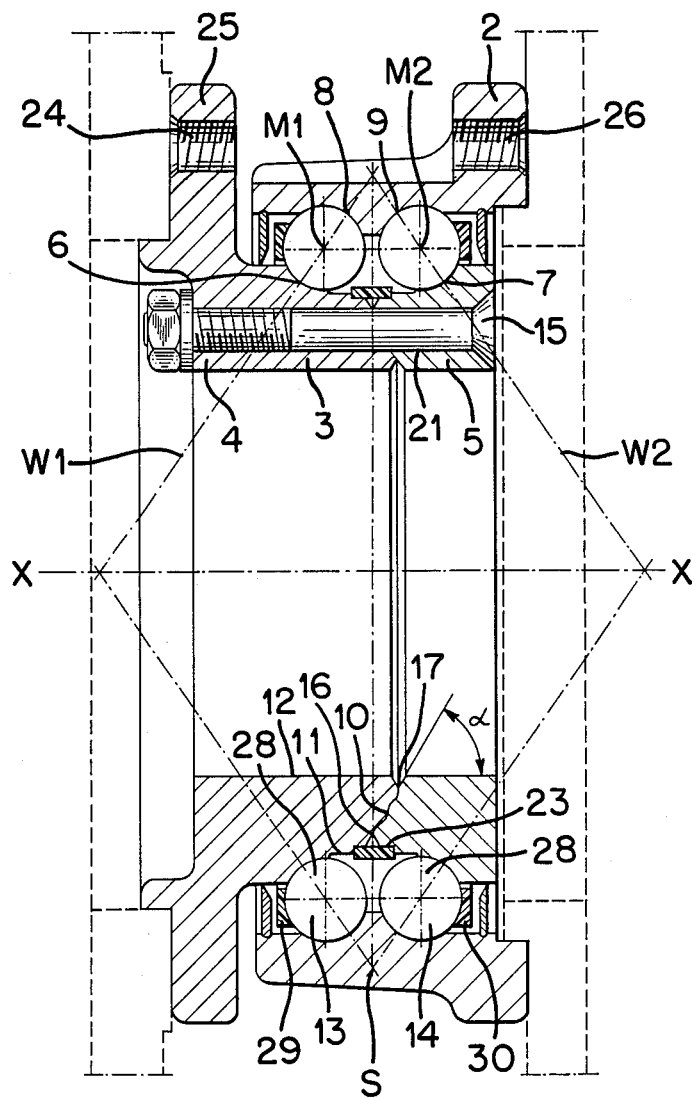

United States Patent [19]

Jacob

[11] Patent Number: 4,865,472
[45] Date of Patent: Sep. 12, 1989

[54] DOUBLE ROW ROLLER BEARING

[76] Inventor: Werner Jacob, Briandring 29, D-6000 Frankfurt/Main 70, Fed. Rep. of Germany

[21] Appl. No.: 164,065

[22] Filed: Mar. 3, 1988

[30] Foreign Application Priority Data

Mar. 17, 1987 [DE] Fed. Rep. of Germany ....... 3708600

[51] Int. Cl.$^4$ .......................... F16C 33/60; F16C 43/04
[52] U.S. Cl. ..................... 384/503; 384/506; 384/542
[58] Field of Search ............... 384/477, 487, 490, 492, 384/499, 502–506, 510, 513, 514, 537, 542; 29/149.4 R, 149.5 R

[56] References Cited

U.S. PATENT DOCUMENTS

| 1,379,945 | 5/1921 | Teetsow | 384/504 |
|---|---|---|---|
| 2,112,754 | 3/1938 | Annen | 384/506 X |
| 3,405,434 | 10/1968 | Hoffman et al. | 29/148.4 |
| 3,672,737 | 6/1972 | Jacob | 384/501 |
| 4,643,595 | 2/1987 | Weavers | 384/505 X |
| 4,730,946 | 3/1988 | Cain | 384/504 X |
| 4,764,153 | 8/1988 | Jacob | 384/544 X |

FOREIGN PATENT DOCUMENTS

| 97523 | 7/1980 | Japan | 384/490 |
|---|---|---|---|
| 961563 | 6/1964 | United Kingdom . | |

Primary Examiner—Thomas R. Hannon
Attorney, Agent, or Firm—Toren, McGeady & Associates

[57] ABSTRACT

A double row roller bearing, especially a tapered seat ball bearing, has an outer ring 1 containing two tracks 8, 9 and is formed in one piece. The inner ring 3 is first produced in one part and after having been machined to its finish-dimensions it is broken into two ring parts 4, 5 by applying pressure. The joint 10 extends relative to the axis of rotation x—x of the bearing at an angle which deviates from a right angle. In the assembled condition, the two inner ring parts 4, 5 are fixed in a position relative to each other which they assumed prior to being separated.

13 Claims, 2 Drawing Sheets

DOUBLE ROW ROLLER BEARING

DESCRIPTION

The invention relates to a double row rolling bearing for receiving radial and/or axial forces, especially a tapered seat bearing, whose outer and inner rings each comprise a track for a row of rolling members and are manufactured in pairs to their finish-dimensions so as to be joined together and subsequently separated by the application of pressure.

It is known to manufacture the inner and outer rings of the bearings so as to be joined together, i.e. the tracks of the inner ring are initially part of a component so that they can be clamped in and machined jointly (U.S. Pat. No. 3,672,737). Subsequently, starting from a notch, this component is radially divided by applying pressure, i.e. by breaking it apart. In order to form a double row bearing, the two ring parts to be provided with adjoining tracks are assembled in a position where the two machined radial faces rest against each other. The two rings to be provided with tracks which are further apart are received in a supporting sleeve which has been provided with a border in order to ensure the necessary hold and axial pretension. These borders are deformed in such a way that they rest against the machined radial faces of the rings. The advantage of this design is the joint production of the outer and inner rings comprising the respective tracks, but there is a great disadvantage in that due to the arrangement chosen, it is possible for the two bearing rows to be radially displaced. This leads to uneven load bearing conditions and thus to a reduction in service life. The advantages of small tolerances gained by producing inner and outer ring jointly are lost in the process. The relatively thin supporting sleeve can only make a small contribution towards good holding conditions. If the sleeve was dimensioned accordingly, the radial dimensions of the bearing would be too large with the result that the advantages of improving the load bearing coefficient by being able to accommodate a larger number of rolling members as compared to bearings with separate outer and inner rings each comprising both tracks would be eliminated.

In view of the above, it is therefore the object of the present invention to provide a double row rolling bearing for receiving radial and/or axial forces, which is of compact design, i.e. has a high load bearing capacity combined with a small outer diameter, which can be produced easily and at reasonable cost and whose divided bearing ring is designed in such a way that any displacements of the two ring parts relative to each other in the assembled condition are impossible.

In accordance with the invention, the objective is achieved in that the outer ring is designed in one piece and comprises both tracks, that the inner ring is broken into two inner ring parts by applying pressure and the joint between the two inner tracks is arranged so as to extend around the circumference and the two inner ring parts, in the assembled condition, are positioned relative to each other as they were prior to being broken apart and fixed to each other so as to be tensioned, and that the joint intersects the axis of rotation of the bearing at an angle deviating from a right angle.

The advantage of such a design is that as a result of being divided the bearing can be filled almost completely with rolling members, which means that a compact design is achieved with respect to the outer diameter, because with a given diameter the load bearing coefficient of the bearing is largely determined by the number of rolling members.

By separating the component by breaking it apart the joint is of an irregular nature, in other words, there are peaks and valleys. Because of these individual characteristics, rejoining and assembly of the two inner ring parts can be achieved in one position only, i.e. in the position in which they were prior to the application of pressure. Furthermore, because of these irregularities and especially because of the inclined course taken by the joint it is possible to obtain a very close connection between the two inner ring parts after tensioning. The irregular surface structures contribute towards receiving radial forces and tilting moments which may act on the bearing when loads are applied eccentrically. Due to the inclined course taken by the joint, the one bearing part is provided with a kind of outer conical face and the other bearing part with a respective inner conical face, but with the surface being irregular.

The teaching in accordance with the invention is not only applicable to bearings comprising balls as rolling members.

In a particularly simple way it is possible to determine the course of the joint by providing the cylindrical outer face and the inner face of the inner ring with annular notches which are axially offset relative to each other along the axis of rotation of the bearing.

Axial fixing and tensioning of the two inner ring parts of the inner ring is preferably effected by bolts.

As an alternative it is also feasible for the two inner ring parts to be connected to each other by a tensioning sleeve resting against their inner faces and supported on radial faces of annular grooves. Deviating from the solution as contained in the state of the art, it is possible to select a relatively thinwalled supporting sleeve because it does not have to take part in carrying any radial forces or tilting moments that may occur.

This design does not have any negative effects on the service life of the bearing.

It is possible to provide the two inner ring parts with through-bores in alignment with each other. The connecting bolt provided for connecting the two inner ring parts may also be used for simultaneously providing a connection with a bearing block.

A particularly favourable supporting base and thus a high load bearing capacity in respect of tilting moments are achieved if the point of intersection of the effective lines of the two bearing rows is positioned radially outside the centrepoint track of their rolling members.

In order to avoid losing lubricants and to prevent dirt from penetrating it is proposed to cover the notch in the outer face with a seal. But the notch may also be used for receiving the seal.

In a further embodiment it is proposed that one of the inner ring parts and/or the outer ring parts are designed to be integral with the fixing flange. In this way it is possible to provide a bearing which is ready for installation and which merely needs to be connected by bolts to the components to be supported. However, in this case it is necessary for the bearing ring parts to be tensioned relative to each other, i.e. in the condition as delivered the two bearing ring parts are already tensioned relative to each other. To connect the bearing to the components to be supported it is further proposed to provide the outer ring or its flange with fixing bores.

It is furthermore proposed that the inner ring parts or the flange connected to one inner ring part should be provided with fixing bores.

It is particularly favourable to apply the design as proposed to tapered seat ball bearings.

Applications for such bearings are found in general engineering but also motor vehicle construction for supporting the non-driven wheels of the vehicle. One advantage of designing a roller bearing in accordance with the invention is easy maintenance in that it is possible to replace individual components.

Figure 2:
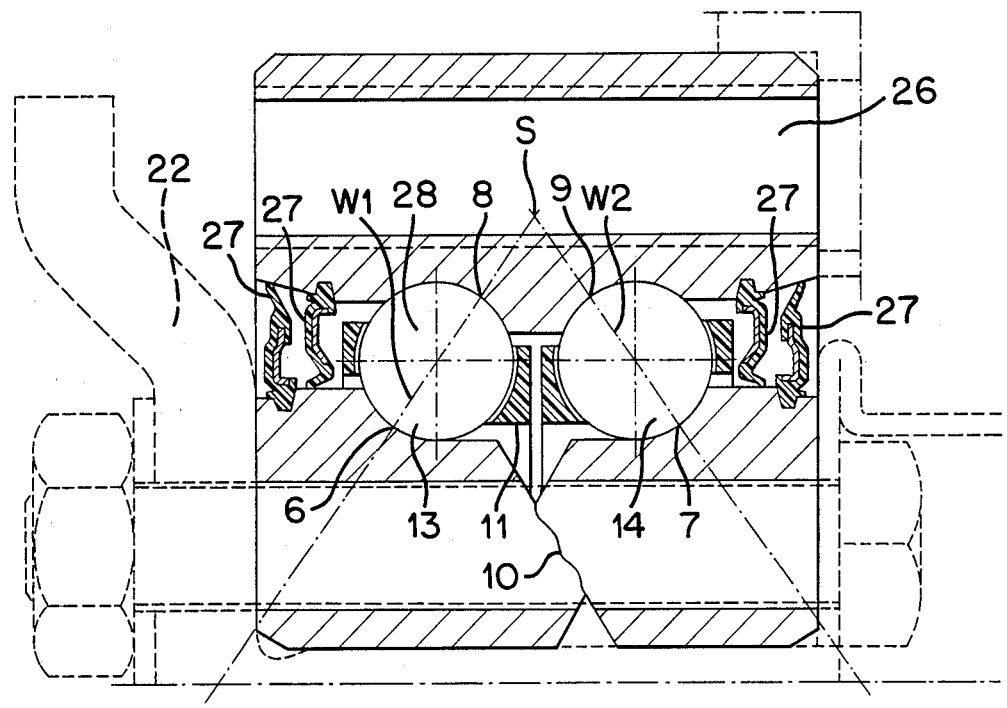
Figure 3:
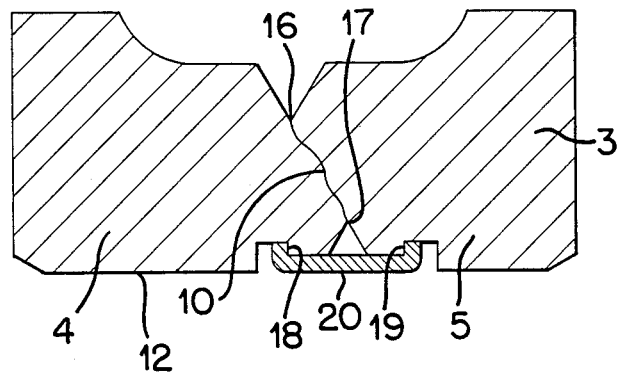

The advantages of the embodiments of the double row roller bearing in accordance with the invention are illustrated in the drawing wherein FIG. 1 is a semi-section through a roller bearing in the form of a tapered seat ball bearing with flanged connections, FIG. 2 shows an embodiment where axial tensioning is effected in the course of connecting the components to be supported, and FIG. 3 shows a detail of an alternative for holding the two inner ring parts relative to each other.

The general design of the two embodiments in FIGS. 1 and 2 is identical. To that extent, the description of FIG. 1 also applies to the embodiment as illustrated in FIG. 2.

The roller bearing has been provided with two rows 13, 14 of rolling members in the form of balls 28. The outer ring 1 of the roller bearing is designed in one part. It is provided with two axially spaced tracks 8, 9. The axial offset extends along the axis of rotation x—x of the bearing. In the present case, the tracks 8, 9 are arranged in such a way that the resulting shoulder, in each case, points outwardly. Between the two tracks 8, 9, there is obtained a raised annular shoulder. The outer ring 1 has been provided with a flange-like projection 2 which contains fixing bores 24 by means of which it can be connected to the component to be supported via bolts.

Initially, the inner ring 3 is manufactured in one part. It also comprises two tracks 6, 7. The track faces face each other.

Between the oppositely arranged tracks 6 and 8 at the inner ring 3 and the outer ring 1 provision has been made for balls 28 arranged so as to be capable of rolling. The balls 28 are held in a cage 29 and circumferentially distributed. The balls 28 form the first bearing row 13. The track on which the centers of the balls 28 move have been given the reference number M1. As a result of the arrangement of the tracks 6, 8 relative to each other, one obtains an effective line W1 extending through the centre point track M1. The effective line W1 extends at an angle, i.e. it intersects the axis of rotation x—x at an angle which deviates from a right angle. The second row 14 of rolling members in the tracks 7, 9 is arranged in a similar way, with the inclination being reversed, however, The balls 28 are held and spaced by a cage 30. The effective line W2 extending through the centre point track M2 extends at the same angle of inclination in the opposite direction to the effective line W1, so that a point of intersection is obtained. This point of intersection S is positioned outside the pitch circle of the center point tracks M1 and M2 of the balls 28 of the two bearing rows 13, 14. The distance between the two points of intersection of the effective lines W1 and W2 with the axis of rotation x—x of the bearing provides the effective supporting base for receiving tilting moments. This supporting base is particularly advantageous if the point of intersection S is positioned radially outside the centre point tracks M1 and M2.

As can also be seen from FIG. 1, the inner ring 3 comprises a flange 25 for providing a connection with the component to be supported. The inner ring 3 is first produced in one part. The two tracks 6 and 7 are machined in a clamping device. After finish-machining the inner bearing ring 3, i.e. especially after hardening, the inner ring 3 is separated into two inner ring parts 4, 5. Separation is achieved by applying pressure in the radial direction. For this purpose provision has been made for two annular notches on the outer face 11 between the two tracks 6,7 and in the inner face 12 (16 and 17). The two notches 16, 17 are arranged so as to be offset relative to each other in the axial direction along the axis of rotation x—x of the bearing. If pressure is applied radially on to the finished inner ring 3, it is broken apart into two inner ring parts 4, 5. The joint extends at an angle, i.e. it intersects the axis of rotation x—x of the bearing at an angle which deviates from a right angle. The surface of the joint 10 is irregular in accordance with the structure of the material used. Re-positioning of the two inner ring parts 4 and 5 relative to each other is possible in one position only, i.e. in the position which they assumed relative to each other prior to being broken apart. In the assembled position, the two inner ring parts 4, 5 are held together by circumferentially distributed bolts 15 inserted into bores 21 which may be designed as through-bores. However, it is also possible for the bores associated with the inner ring part 4 to be designed as threaded bores and for the bores associated with the inner ring part 5 to be designed as through-bores. The bolts 15 are inserted from the radial face of the second inner ring part 5. Because of the separation of the inner ring 3 into two inner ring parts 4, 5 it is possible to assemble the bearing rows 13, 14 axially to the extent that across their entire circumference the bearing rows 13, 14 can be filled almost one hundred percent with rolling members in the form of balls 28.

In addition, provision has been for a sealing ring 23 on the outer face 11, covering the joint 10.

Furthermore, seals 27 have been provided for sealing the bearing interior not FIG. 2.

In the case of the embodiment of FIG. 2, the roller bearing is initially only pre-assembled, whereas actual tensioning is effected by the bolts 15 through connection with a bearing block 22. Pre-assembly is achieved by arranging a tensioning sleeve 20 on the inner face 12 of the inner ring 3, i.e. in the bore in the region between the two tracks 6, 7. This design is shown as a detail in FIG. 3. The outer face of the tensioning sleeve rests against a stepped annular face of the inner face 12. The tensioning sleeve has been provided with two borders which are deformed for assembly purposes with one border resting against the radial face 18 of a groove of the inner ring part 4 and the other border, after deformation, resting against the radial face 19 of a groove of the inner ring part 5.

I claim:

1. A double row rolling bearing for receiving radial and/or axial forces, having outer and inner rings each comprising a pair of tracks each for a row of rolling members and said inner and outer rings manufactured to finish-dimensions thereof characterised in that the outer ring (1) is formed in one piece and comprises both tracks (8, 9), that the inner ring (3) is broken into two inner ring parts (4, 5) by applying pressure and having a joint

(10) between the two inner tracks (6, 7) arranged so as to extend around the circumference thereof, and the two inner ring parts (4, 5), in the assembled condition, are positioned relative to each other as they were prior to being broken apart and fixed to each other so as to be tensioned, and that the joint (10) intersects the axis of rotation (x—x) of the bearing at an angle (a) deviating from a right angle.

2. A double row rolling bearing according to claim 1, characterised in that the inner ring (3), has a cylindrical outer face (11) and inner face (12) each provided with annular notches (16, 17) axially offset along the axis of rotation (x—x) of the bearing relative to each other.

3. A double row rolling bearing according to claim 2, characterised in that the notch (16, 17) of the outer face (11) is covered by a seal (23).

4. A double row rolling bearing according to claim 1, characterised in that the two inner ring parts (4, 5) of the inner ring (3) are connected to each other by bolts (15).

5. A double row rolling bearing according to claim 4, characterised in that the two inner ring parts (4, 5) have through-bores (21) in alignment with each other.

6. A double row rolling bearing according to claim 4, characterised in that the connecting bolts (15) simultaneously serve for providing a connection with a bearing block (22).

7. A double row rolling bearing according to claim 1, characterised in that the two inner ring parts (4, 5) are connected to each other by a tensioning sleeve (20) resting against part of an inner face (12) of the inner ring parts and supported on radial faces (18, 19) of annular grooves provided in the inner face.

8. A double row rolling bearing according to claim 1, characterised in that a point of intersection (S) of effective lines (W1, W2) of the two bearing rows (13, 14) is positioned radially outside a centerpoint track (M1, M2) of the rolling members (28).

9. A double row rolling bearing according to claim 1, characterised in that one of the inner ring parts (4) is designed to be integral with fixing flange (25).

10. A double row rolling bearing according to claim 1 characterised in that the inner ring parts (4) or said flange (25) connected to one inner ring part (4) have fixing bores (24).

11. A double row rolling bearing according to claim 1, characterized in that the outer ring (1) is designed to be integral with a fixing flange (2).

12. A double row rolling bearing according to claim 11, characterised in that the outer ring (2) or said flange (25) has fixing bores (24).

13. A double row roller bearing according to claim 1, characterised in that it is a tapered seat ball bearing.

* * * * *